United States Patent
Xu et al.

(10) Patent No.: US 12,043,882 B2
(45) Date of Patent: Jul. 23, 2024

(54) METHOD FOR SAFELY OXIDIZING AND ROASTING NEODYMIUM-IRON-BORON POWDER AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(72) Inventors: Jianfeng Xu, Guangdong (CN); Changdong Li, Guangdong (CN); Dingshan Ruan, Guangdong (CN); Linlin Mao, Guangdong (CN); Yulong Liao, Guangdong (CN); Ding Yang, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/265,373

(22) PCT Filed: Dec. 30, 2021

(86) PCT No.: PCT/CN2021/142928
§ 371 (c)(1),
(2) Date: Jun. 5, 2023

(87) PCT Pub. No.: WO2022/242185
PCT Pub. Date: Nov. 24, 2022

(65) Prior Publication Data
US 2024/0035127 A1    Feb. 1, 2024

(30) Foreign Application Priority Data
May 18, 2021   (CN) .......................... 202110540351.1

(51) Int. Cl.
*C22C 38/00*    (2006.01)
*C22B 1/02*    (2006.01)
*C22C 22/00*    (2006.01)

(52) U.S. Cl.
CPC .............. *C22C 38/005* (2013.01); *C22B 1/02* (2013.01); *C22C 2202/02* (2013.01)

(58) Field of Classification Search
CPC ...... C22C 38/005; C22C 2202/02; C22B 1/02
See application file for complete search history.

(56) References Cited

U.S. PATENT DOCUMENTS

2015/0292060 A1* 10/2015 Laucournet ............. C22B 59/00
423/21.1

FOREIGN PATENT DOCUMENTS

| CN | 102154553 A | * | 8/2011 | ............. C22B 23/04 |
| CN | 102154553 A | | 8/2011 | |

(Continued)

OTHER PUBLICATIONS

International Search Report and Written Opinion of the International Search Authority issued by the China National Intellectual Property Administration for International Patent Application No. PCT/CN2021/142928, mailed on Mar. 21, 2022, with an English translation.

(Continued)

*Primary Examiner* — Anthony M Liang
*Assistant Examiner* — Danny N Kang
(74) *Attorney, Agent, or Firm* — Myers Wolin, LLC

(57) ABSTRACT

A method for safely oxidising roasting NdFeB powder material. The method may include: S1: magnetizing and (Continued)

drying the NdFeB powder material; S2: heating the magnetized and dried NdFeB powder material to spontaneous combustion, and then preparing the spontaneous combustion product into a powder; and S3: magnetizing and then oxidising roasting the powder to obtain NdFeB oxide.

5 Claims, 1 Drawing Sheet

(56) References Cited

FOREIGN PATENT DOCUMENTS

| | | | |
|---|---|---|---|
| CN | 102154557 | A | 8/2011 |
| CN | 201983601 | U | 9/2011 |
| CN | 105316475 | A | 2/2016 |
| CN | 106498169 | A | 3/2017 |
| CN | 206666603 | U | 11/2017 |
| CN | 109487076 | A | 3/2019 |
| CN | 111410286 | A | 7/2020 |
| CN | 113444874 | A | 9/2021 |
| CN | 113444874 | B | 1/2023 |
| IN | 206661898 | U | 11/2017 |
| KR | 10-1193454 | B1 | 10/2012 |
| KR | 10-1662445 | B1 | 10/2016 |

OTHER PUBLICATIONS

First Office Action and Search Report issued by the State Intellectual Property Office of People's Republic of China for Chinese Patent Application No. 202110540351.1, dated Mar. 2, 2022, with an English translation.

Wang et al., "Magnetization to Improve the Reaction of Iron Powder with Water Vapor Experiment", Zhongxuesheng Shulihua Jiao Yu Xue Jiaoyan Ban, Jan. 31, 2021, ISSN: 1003-2215, No. 01, China, with an English abstract.

Fu et al., "Research progress on the recycling and utilizationof Nd—Fe—B wastes", Nonferrous Metals Science and Engineering, Feb. 2020, pp. 92-97, vol. 11, No. 1, China, with an English abstract.

Gao et al., "Study on Rare Earth Element Recovery from Cerium Rich NdFeB Waste Material", China Resources Comprehensive Utilization, Feb. 2019, ISSN: 1008-9500, vol. 37, No. 2, China, with an English abstract.

Yuyang Bian, "Study on the new process of recovering rare earth elements from NdFeB waste", Chinese Doctoral Dissertations 1 Series of Full-text Database, Engineering Science and Technology I, 2017, ISSN: 1674-022X, with an English abstract.

Notification to Grant Patent Right for Invention issued by the State Intellectual Property Office of People's Republic of China for Chinese Patent Application No. 202110540351.1, dated Oct. 25, 2022, with an English translation.

* cited by examiner

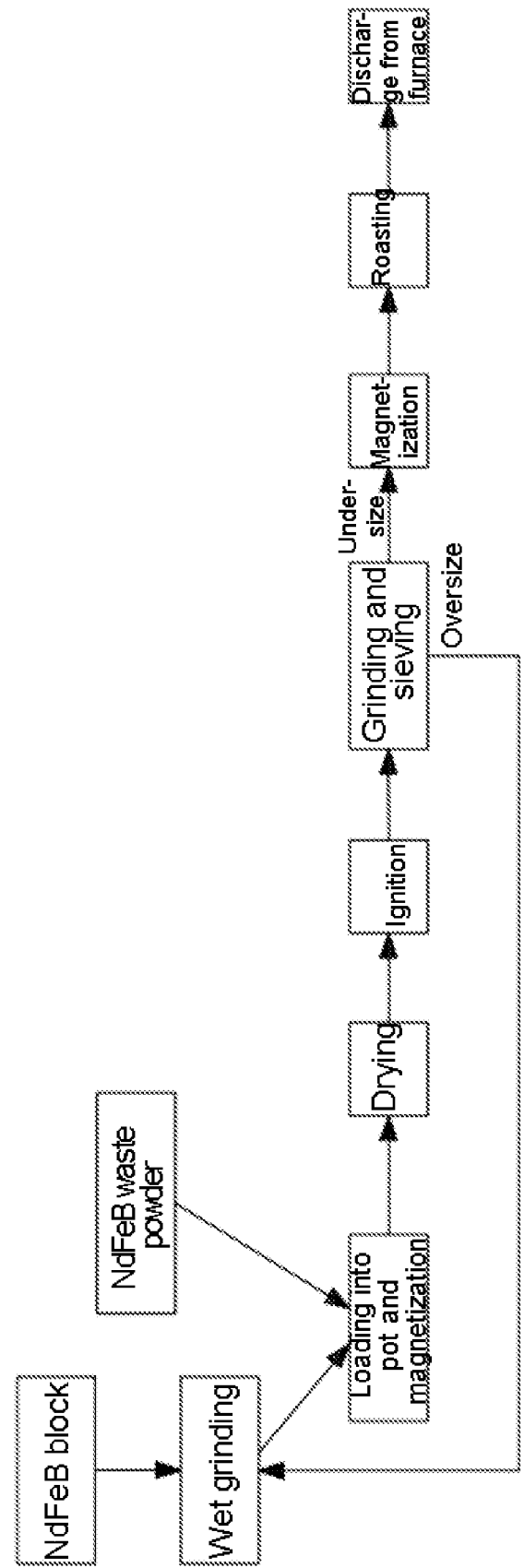

METHOD FOR SAFELY OXIDIZING AND ROASTING NEODYMIUM-IRON-BORON POWDER AND APPLICATION THEREOF

CROSS-REFERENCE TO RELATED APPLICATIONS

This application is a National Stage under 35 U.S.C. § 371 of International Application Number PCT/CN2021/142928, filed on Dec. 30, 2021, and which designated the U.S., which claims priority to Chinese patent application No. 202110540351.1, filed on May 18, 2021. The contents of each are incorporated herein by reference in their entirety.

TECHNICAL FIELD

The present invention relates to the technical field of the recycling of waste NdFeB magnets, and more particularly, to a method for safely oxidizing roasting NdFeB powder material and the use thereof.

BACKGROUND

NdFeB (neodymium iron boron) permanent magnets have become the most widely used rare earth magnets in the world due to their excellent magnetic properties, which are generally known as "king magnets". They can improve the efficiency of motors and drives when applied in electric vehicles and wind power motors. However, during the production of NdFeB permanent magnets, 20-30% of scraps is produced. In addition, the quantity of scrapped NdFeB magnets in motors is increasing year by year. These NdFeB scraps contain 70% of iron and about 30% of rare earth elements. Discarding them randomly will cause shortage of rare earth resources and environmental and ecological problems. In order to deal with the shortage of rare earth resources, recycling NdFeB magnets is an important way to alleviate the current overexploitation of rare earth resources and protect the environment, and is of great significance to the protection of rare earth resources.

Oxidizing roasting is an important process in the process of recycling NdFeB magnets, which is also the process with the greatest risk of metal fire and explosion, because the NdFeB magnets contain rare earth metals, which are second only to alkali metals in activity, and powders thereof have a greater metal fire and explosion hazard than iron powder. NdFeB powder material has a spontaneous combustion temperature of about 150° C. and a lower explosive limit of 20-30 g/m$^3$. Therefore, the oxidizing roasting of NdFeB has to ensure not only a high degree of oxidation, but also safety. At present, oxidizing roasting processes for NdFeB magnets mostly use a rotary kiln, which can form a "material curtain" during material rotation, so that NdFeB powder material is fully in contact with air during roasting. However, rotary kilns have a slow oxidation reaction rate and a high energy consumption, and therefore, it often takes 4-8 hours for high-temperature roasting or secondary roasting in order to achieve a higher oxidation rate. In addition, when a furnace body rotates, the NdFeB develops raised dust in a confined space, presenting a great dust hazard and a great fire and explosion risk.

SUMMARY

The present invention aims to solve at least one of the technical problems existing in the prior art as mentioned above. To this end, the present invention proposes a method for safely oxidizing roasting NdFeB powder material and the use thereof, whereby a risk of metal fire and explosion present during the oxidizing roasting of the NdFeB powder material can be reduced.

According to one aspect of the present invention, a method for safely oxidizing roasting NdFeB powder material is proposed, which comprises the following steps:

At a step of S1: magnetizing and drying the NdFeB powder material;

At a step of S2: heating the magnetized and dried NdFeB powder material to spontaneous combustion, and then preparing the spontaneous combustion product into a powder; and At a step of S3: subjecting the powder to magnetization and then oxidizing roasting to obtain NdFeB oxide.

At the step of S1, a drying furnace is used for drying, and the drying furnace is provided with an induced air device for extracting water vapor from the furnace; the magnetized NdFeB is in a radial form, which can realize rapid drying of the NdFeB powder material, and powder particles magnetically attract each other, so that the situation of NdFeB raise dust is difficult to appear; and in step S3, air is introduced during oxidizing roasting, and the undersize after magnetization is in the form of cotton-like structure, which is fully in contact with the air at a high temperature so as to achieve a high degree of oxidation.

During the spontaneous combustion process, the NdFeB powder material is converted from an alloy powder to metal oxides, and the volume expands; in addition, the high temperature generated during the spontaneous combustion process promotes edge cohesion between the powder particles, and therefore, it is necessary to grind the spontaneous combustion product. Since the material after spontaneous combustion has already been oxides (insufficiently oxidized) and has been magnetized and there is a low bonding force in the powder, no more bonding occurs during the subsequent oxidizing roasting of the NdFeB powder material, and air can enter the powder to achieve high degree of oxidation.

The bonding force varies. If not being magnetized, the powder will be densely packed, the bonding force will be strong and the bonding will be tight.

In some embodiments of the present invention, in step S1, the NdFeB powder material is prepared by wet grinding from NdFeB blocks or is an oil-free NdFeB waste powder. The reason for using the wet grinding of NdFeB is that the finer the particles of the NdFeB powder material, the easier it is to be oxidized, and the more conducive it is for the subsequent leaching and recovery of rare earth elements; however, the process of the grinding and refinement of NdFeB is carried out in a confined space, and the heat generated by the grinding equipment is sufficient to cause the NdFeB powder material to ignite spontaneously, which leads to a great risk of metal fire and explosion while damaging the equipment; therefore, adding water during the NdFeB grinding process can cool the equipment and effectively avoid NdFeB dust, thereby reducing the risk of spontaneous combustion and metal fire and explosion during the NdFeB grinding process.

In some embodiments of the present invention, in step S1, the NdFeB powder material has a particle size of 50-200 mesh.

In some embodiments of the present invention, in steps S1 and S3, the magnetization refers to direct current magnetization, pulse magnetization or strong magnetization of the NdFeB powder material.

In some embodiments of the present invention, in step S1, the drying temperature is 80-100° C., and the drying time is 0.5-3 h; and the moisture content of the NdFeB powder material is <0.3% after drying. The reason for controlling the moisture content of NdFeB is that at a high temperature, iron powder reacts easily with water vapor to generate hydrogen by means of displacement, and the NdFeB powder material also reacts with water vapor at the high temperature, causing a great danger; therefore, it is necessary to carry out a low-temperature drying treatment before the ignition roasting of the NdFeB in order to ensure that moisture does not enter the ignition furnace.

In some embodiments of the present invention, in step S2, the process of heating to spontaneous combustion involves: placing the NdFeB powder material in an ignition furnace for ignition and spontaneous combustion, wherein the temperature of ignition furnace is 150-350° C., and the treatment time is 0.01-1 h.

In some embodiments of the present invention, step S2 further comprises, after preparing the powder, carrying out a sieving process, and taking an undersize powder for the next process, wherein the mesh number of sieve is 50-200.

In some embodiments of the present invention, in step S2, the oversize after sieving is subjected to wet grinding and then returned to step S1.

In some embodiments of the present invention, in step S3, the temperature of oxidizing roasting is 600-800° C. and the treatment time of 1-3 h.

In some embodiments of the present invention, the equipment used for the drying, ignition and oxidizing roasting is one of or a combination of some of a pushed slab kiln, a roller kiln, a box-type furnace, a muffle furnace or a tube furnace.

The present invention further provides the use of the method in the recycling of NdFeB magnets.

According to a preferred embodiment of the present invention, at least the following beneficial effects are presented:

1. Through three-stage stepwise treatment involving low-temperature drying, medium-temperature ignition, and high-temperature oxidation, the present invention controls the risk of the spontaneous combustion of the NdFeB powder material in a medium-temperature ignition furnace so as to facilitate control and isolation.

2. The ignition furnace can accurately ignite the NdFeB powder material, and through the spontaneous combustion thereof, the NdFeB powder material is oxidized to a low degree, thereby greatly reducing the risk of spontaneous combustion and energy consumption caused by subsequent high-temperature roasting.

3. The magnetization of the NdFeB powder material can effectively avoid NdFeB dust during the roasting process, thereby effectively protecting the equipment and operators, and reducing the risk of fire and explosion of the dust; in addition, the magnetized NdFeB powder material is in a radial and cotton-like structure, leading to increased contact area with air, thereby effectively increasing the drying speed and oxidation degree, and reducing energy consumption.

4. Since the NdFeB powder material is magnetized before roasting, the roasted NdFeB powder material remains the original loose structure and not easy to agglomerate.

BRIEF DESCRIPTION OF DRAWINGS

The present invention will be further illustrated below in conjunction with the accompanying drawings and embodiments, wherein FIG. 1 is a process flow diagram of an embodiment of the present invention.

DETAILED DESCRIPTION

The concept of the present invention and the technical effects produced thereby will be clearly and completely described in conjunction with examples below in order to fully understand the object, features and effects of the present invention. Obviously, the described examples are merely some, rather than all, of the examples of the present invention, and based on these examples of the present invention, other examples obtained by those skilled in the art without involving any inventive effort all fall within the scope of protection of the present invention.

Embodiment 1

A method for safely oxidizing roasting NdFeB powder material was provided, which comprised the following steps:

At a step of S1: NdFeB powder material (100 mesh) obtained by wet grinding load into a pot at a loading thickness of 6-8 mm, subjecting the loaded NdFeB powder material to pulse magnetization on a magnetization device so as to endow the NdFeB powder material with magnetism, whereby the magnetized NdFeB powder material was in a radial form, and drying the magnetized NdFeB powder material at 80° C. for 1 h so as to control the moisture content to 0.1%;

At a step of S2: the dried NdFeB powder material remaining a fluffy structure as shown after magnetization, and at this point entering an ignition furnace at 150° C., wherein the NdFeB powder material spontaneously ignited within 8 min, and after spontaneous combustion, the NdFeB naturally cooled to room temperature at which the NdFeB powder material was cohered; and grinding the NdFeB powder material by means of a twin roller, passing the ground NdFeB powder material through a 100-mesh sieve with a sieving rate of 99%, returning the oversize to wet grinding, and loading the undersize into a pot at a loading thickness of 8-10 mm; and At a step of S3: firstly magnetizing the loaded NdFeB powder material, then roasting the NdFeB powder material at 800° C. for 2 h during which air was introduced, wherein during the roasting process, the NdFeB powder material was demagnetized, but could remain the original magnetized cotton-like structure, and the oxidizing roasting NdFeB powder material had an iron oxidation degree is 97.5%, the ferrous iron content is 1.2 wt %, and the total iron content is 48.9 wt %.

Embodiment 2

A method for safely oxidizing roasting NdFeB powder material was provided, which comprised the following steps:

At a step of S1: passing waste powder recovered during the NdFeB production process through a 50-mesh sieve, loading the undersize into a pot at a loading thickness of 6-8 mm, subjecting the loaded NdFeB powder material to pulse magnetization on a magnetization device so as to endow the NdFeB powder material with magnetism, whereby the magnetized NdFeB powder material was in a radial form, and drying the magnetized NdFeB powder material at 80° C. for 1 h so as to control the moisture content to 0.2%;

At a step of S2: the dried NdFeB powder material remaining a fluffy structure as shown after magnetization, and at this point entering an ignition furnace at 300° ° C., wherein the NdFeB powder material spontaneously ignited within 5 min, and after spontaneous combustion, the NdFeB naturally coole to room temperature at which the NdFeB powder material was cohered; and grinding the NdFeB powder material by means of a twin roller, passing the ground NdFeB powder material through a 50-mesh sieve with a sieving rate of 99%, subjecting the oversize to wet grinding, and loading the undersize into a pot at a loading thickness of 8-10 mm; and At a step of S3: firstly magnetizing the loaded NdFeB powder material, then roasting the NdFeB powder material at 800° C. for 2 h during which air was introduced, wherein during the roasting process, the NdFeB powder material was demagnetized, but could remain the original magnetized cotton-like structure, and the oxidizing roasting NdFeB powder material had an iron oxidation degree is 95.5%, the ferrous iron content is 2.2 wt %, and the total iron content is 48.5 wt %.

Comparative Example 1

The main difference between this comparative example and Embodiment 1 lay in that the NdFeB powder material did not undergo a magnetization treatment during three-stage oxidizing roasting, and comparison was made in terms of drying time, spontaneous combustion phenomenon, sieving rate, and oxidation degree of oxides in the process, specifically as shown in Table 1. The specific process of this comparative example involved:

S1: NdFeB powder material (100 mesh) obtained by wet grinding load into a pot at a loading thickness of 6-8 mm, and drying the loaded magnetized NdFeB powder material at 80° C. for 1.5 h so as to control the moisture content to 0.1%;

S2: bringing the dried NdFeB powder material into an ignition furnace at 150° C., wherein the NdFeB powder material spontaneously ignited within 8 min, and after spontaneous combustion, the NdFeB naturally cooled to room temperature at which the NdFeB powder material was severely cohered; and grinding the NdFeB powder material by means of a twin roller, passing the ground NdFeB powder material through a 100-mesh sieve with a sieving rate of 95%, returning the oversize to wet grinding, and loading the undersize into a pot at a loading thickness of 8-10 mm; and S3: roasting the loaded NdFeB powder material at 800° C. for 2 h during which air was introduced, wherein the oxidizing roasting NdFeB powder material had an iron oxidation degree of 92.5%, the ferrous iron content is 3.6 wt %, and the total iron content is 48 wt %.

Comparative Example 2

The difference between this comparative example and Embodiment 1 lay in that NdFeB powder material underwent neither three-stage oxidizing roasting nor a magnetization treatment, and comparison was made in terms of drying time, spontaneous combustion phenomenon, sieving rate, and oxidation degree of oxides in the process, specifically as shown in Table 1. The specific process of this comparative example involved:

NdFeB powder material (100 mesh) obtained by wet grinding load into a pot at a loading thickness of 6-8 mm, heating the loaded NdFeB powder material from room temperature 25° C. to 800° C. at a ramp rate of 5° C./min, maintaining the temperature for 2 h, wherein the drying and spontaneous combustion situations of the powder was observed during the heating period, and sieving roasted NdFeB oxide with a sieving rate of only 85%, wherein the oxidation degree of iron in the NdFeB oxide was only 88%.

TABLE 1

| Example | Drying time | Spontaneous combustion phenomenon | Sieving rate of spontaneous combustion product | Oxidation degree |
|---|---|---|---|---|
| Embodiment 1 (Three-stage, magnetized roasting) | 1 h | No flame was found, and the time for combustion phenomenon to complete was 6 min | 99% | 97.5% |
| Comparative Example 1 (Three-stage, non-magnetized roasting) | 1.5 h | No flame was found, and the time for combustion phenomenon to complete was 10 min | 95% | 92.5% |
| Comparative Example 2 (Non-three-stage, non-magnetized roasting) | Continuous | At about 150° C., NdFeB spontaneously ignited and flame appeared | (NdFeB oxide) 85% | 88% |

It could be seen from Table 1 that compared with Embodiment 1, the drying time and the time for spontaneous combustion to complete of Comparative Example 1 were longer, and the sieving rate of the spontaneous combustion product and the oxidation degree were lower, indicating that the magnetization treatment could make the NdFeB powder material in a radial form, thereby speeding up the drying; in addition, the powder was not easy to agglomerate and was fully in contact with air at a high temperature so as to achieve a high degree of oxidation. By observing the spontaneous combustion situation of Comparative Example 2, it could be seen that at about 150° C., the NdFeB powder material reacted with water vapor in the furnace to generate hydrogen by means of displacement and thereby cause flame combustion, which indicates that if no magnetized three-stage treatment was used for the roasting process, the fire and explosion hazard of the NdFeB powder material would be increased. In addition, the sieving rate of NdFeB oxide was relatively low. This was because after the spontaneous combustion of the NdFeB powder material without a magnetization treatment, severe agglomeration occurred and the particles of the powder fused with each other; furthermore, after high-temperature roasting, the structure thereof was denser, making it difficult for the NdFeB inside to come into contact with the air, so the degree of oxidation was not as high as that of Embodiment 1.

FIG. 1 is a process flow diagram of an embodiment of the present invention, wherein NdFeB powder material (a material obtained by wet grinding from NdFeB blocks or an NdFeB waste powder) is loaded into a pot and subjected to magnetization, drying, ignition, grinding and sieving, and the undersieve is further magnetized and roasted to obtain NdFeB oxide, while the oversieve is returned to wet grinding.

The embodiments of the present invention have been described above in detail in conjunction with the accompanying drawings; however, the present invention is not limited to the above-mentioned embodiments, and within the scope of knowledge possessed by those of ordinary skill in the art, various modifications can be made without departing from the gist of the present invention. In addition, without conflict, the embodiments of the present invention and the features in the embodiments can be combined with each other.

The invention claimed is:

1. A method for safely oxidizing roasting NdFeB powder material, comprising:
   S1: magnetizing and drying the NdFeB powder material;
   S2: heating the magnetized and dried NdFeB powder material to spontaneous combustion, and then preparing the spontaneous combustion product into a powder; and
   S3: magnetizing and then oxidizing roasting the powder to obtain NdFeB oxide;
   wherein, in step S1, the NdFeB powder material is prepared by wet grinding from NdFeB blocks or is an oil-free NdFeB waste powder; the moisture content of the NdFeB powder material is <0.3% after drying;
   wherein, in step S2, the process of heating to spontaneous combustion involves: placing the NdFeB powder material in an ignition furnace for ignition and spontaneous combustion, wherein the ignition furnace has a furnace temperature of 150-350° C., and the treatment time is 0.01-1 h; and
   wherein, in steps S1 and S3, the magnetization refers to direct current magnetization, pulse magnetization or strong magnetization of the NdFeB powder material.

2. The method of claim 1, wherein, in step S1, the NdFeB powder material has a particle size of 50-200 mesh.

3. The method of claim 1, wherein, step S2 further comprises, after preparing the powder, carrying out a sieving process, and taking an undersize powder for the next process, wherein the mesh number of a sieve for the sieving is 50-200.

4. The method of claim 3, wherein, in step S2, the oversize after sieving is subjected to wet grinding and then returned to step S1.

5. The method of claim 1, wherein, in step S3, the temperature of oxidizing roasting is 600-800° C. and a treatment time of 1-3 h.

* * * * *